US011741139B2

(12) United States Patent
Zhuo et al.

(10) Patent No.: US 11,741,139 B2
(45) Date of Patent: Aug. 29, 2023

(54) SYSTEMS AND METHODS FOR DETERMINING A RESPONSE TO A USER QUERY

(71) Applicant: PayPal, Inc., San Jose, CA (US)

(72) Inventors: Yuzhen Zhuo, Singapore (SG); Sandro Cavallari, Singapore (SG); Van Hoang Nguyen, Singapore (SG); Kim Dung Bui, Singapore (SG); Rey Neo, Singapore (SG); Harsha Singalreddy, Singapore (SG); Lei Xu, Singapore (SG); Hewen Wang, Singapore (SG); Quan Jin Ferdinand Tang, Singapore (SG); Chun Kiat Ho, Singapore (SG)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/317,805

(22) Filed: May 11, 2021

(65) Prior Publication Data

US 2021/0357441 A1 Nov. 18, 2021

(30) Foreign Application Priority Data

May 12, 2020 (EP) .................................... 20174069

(51) Int. Cl.
*G06F 16/332* (2019.01)
*G06F 16/33* (2019.01)
*G06N 20/00* (2019.01)
*H04L 51/02* (2022.01)

(52) U.S. Cl.
CPC ...... *G06F 16/3322* (2019.01); *G06F 16/3334* (2019.01); *G06F 16/3338* (2019.01); *G06N 20/00* (2019.01); *H04L 51/02* (2013.01)

(58) Field of Classification Search
CPC ........ G06F 40/30; G06F 16/33; G06F 16/242; G06F 16/24; G06N 3/08; G06N 20/00
USPC ........... 707/17.098, 708, 748–750, 765, 794, 707/E17.068, E17.069
See application file for complete search history.

(56) References Cited

U.S. PATENT DOCUMENTS

| | | | |
|---|---|---|---|
| 9,053,431 B1 * | 6/2015 | Commons | ................ G06N 3/02 |
| 10,276,170 B2 * | 4/2019 | Gruber | .................... G06F 3/167 |
| 10,509,814 B2 * | 12/2019 | Lastra Diaz | ...... G06F 16/24522 |

(Continued)

OTHER PUBLICATIONS

International Search Report and Written Opinion in PCT Appl. No PCT/US2021/031727 dated Aug. 13, 2021, 13 pages.

(Continued)

*Primary Examiner* — Tony Mahmoudi
*Assistant Examiner* — Linh Black
(74) *Attorney, Agent, or Firm* — Kowert, Hood, Munyon, Rankin & Goetzel, P.C.

(57) ABSTRACT

Systems and methods are presented for providing a response to a user query. Reception of a user query is detected. An augmentation machine learning model is utilized to determine one or more variations of the user query that correspond to a semantic meaning of the user query. A plurality of response candidates is determined that correspond to the user query by comparing the user query and the one or more variations of the user query to a plurality of documents. A final response candidate is determined from the plurality of response candidates based on utilizing a semantic machine learning model to perform a semantic comparison between the plurality of response candidates and at least the user query.

20 Claims, 7 Drawing Sheets

(56) References Cited

U.S. PATENT DOCUMENTS

| | | | |
|---|---|---|---|
| 11,016,966 B2* | 5/2021 | Kim | G06F 40/56 |
| 2004/0030556 A1* | 2/2004 | Bennett | G06F 40/289 |
| | | | 704/E15.04 |
| 2009/0070311 A1 | 3/2009 | Feng | |
| 2018/0357286 A1 | 12/2018 | Wang et al. | |
| 2019/0042988 A1* | 2/2019 | Brown | G06N 5/022 |
| 2019/0080225 A1 | 3/2019 | Agarwal et al. | |
| 2019/0138660 A1 | 5/2019 | White et al. | |
| 2019/0156198 A1 | 5/2019 | Mars et al. | |
| 2019/0212879 A1 | 7/2019 | Anand et al. | |
| 2020/0117446 A1* | 4/2020 | Smith | G06F 8/36 |
| 2021/0182996 A1* | 6/2021 | Cella | G06N 3/047 |

OTHER PUBLICATIONS

Cahn, "Chatbot: Architecture, Design, & Development", University of Pennsylvania, Apr. 2017, retrieved on [Aug. 7, 2021]. Retrieved from the internet <URL:https://d1wqtxts1xzle7.cloudfront.neU57035006/CHATBOT_thesis_final.pdf> entire document.

European Search Report in EP Appl. No. 20174069.3 dated Sep. 21, 2020, 9 pages.

Yan et al., "Learning to Respond with Deep Neural Networks for Retrieval-Based Human-Computer Conversation System," SIGIR '16 Jul. 17-21, 2016, pp. 55-64.

Yolchuyeva et al., "Text normalization with convolutional neural networks," International Journal of Speech Technology (2018) 21, pp. 589-600.

Alex Egg, "Query2vec: Search query expansion with query embeddings," Nov. 4, 2019; retrieved from URL: https://bytes.grubhub.com/search-query-embeddings-using-query2vec-f5931df27d79; 18 pages.

Roy et al., "Using Word Embeddings for Information Retrieval: How Collection and Term Normalization Choices Affect Performance," CIKM '18, Oct. 22-26, 2018, pp. 1835-1838.

International Preliminary Report on Patentability for Application No. PCT/US2021/031727, dated Nov. 24, 2022, 7 pages.

Communication pursuant to Article 94(3) EPC issued in EP Patent Application No. 20174069.3; 8 pages; dated Feb. 21, 2023.

\* cited by examiner

SYSTEMS AND METHODS FOR DETERMINING A RESPONSE TO A USER QUERY

BACKGROUND

The present specification generally relates to facilitating communication with a user, and more specifically, to determining a response to a user query according to various embodiments of the disclosure.

Service providers that provide services (e.g., purchases of goods, payment transactions, etc.) to customers often enable their customers to initiate direct communication with the service providers and to send user queries to automated customer support agents via one or more media or communication channels (e.g., online chat sessions, emails, etc.).

The automated customer support agents often face the challenge of retrieving relevant information that correctly answers the user queries. Key-word based retrieval solutions can be used to effectively model the syntactic relationship between a user query and response candidates. However, key-word based retrieval solutions pose several limitations. They make no use of semantic similarities between words and are insensitive to different syntactic variants of a same user query, leading to a low recall. Further, key-word based retrieval solutions do not capture the relationship between queries and answers. As a consequence, key-word based retrieval solutions can provide relevant answers but fail to indicate which is the best solution. The key-word based retrieval solutions also lack a proper feedback loop, and are purely unsupervised learning algorithms. Thus, there is a need for providing an advanced mechanism for determining a response to a user query.

Figure 1:
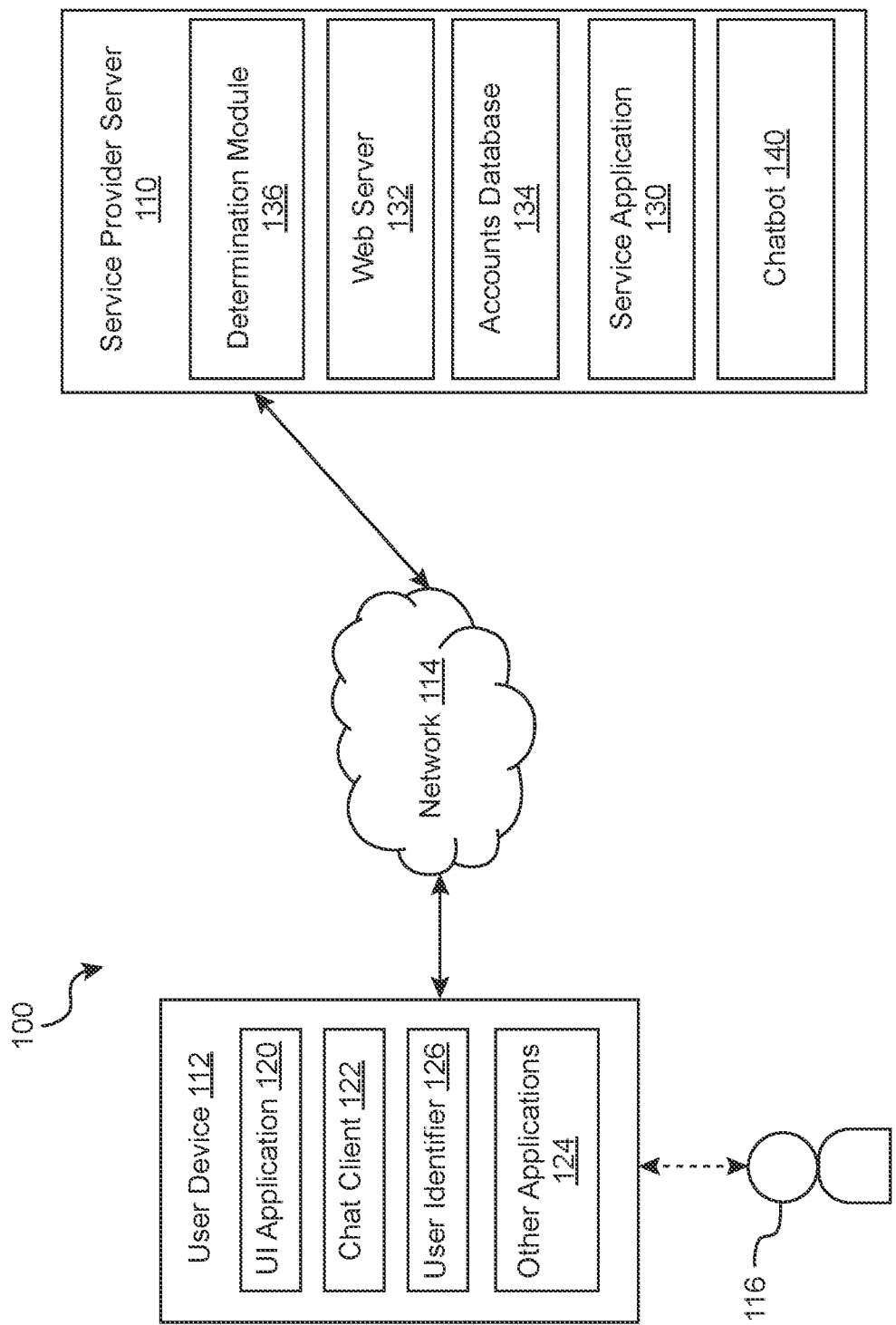
FIG. 1 is a block diagram illustrating an electronic system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for determining and providing a response to a query of a customer or, generally speaking, a user. In some embodiments, a service provider may utilize a system to provide automated assistance to a user query. When a user sends a query to the service provider, the user may, for example, want to inquire about a product or service offered by the service provider, inquire about information (e.g., a status, etc.) related to a transaction (e.g., a payment transaction, a fund transfer transaction, a refund transaction, an account creation transaction, etc.), file a dispute, cancel an order or a payment, query for suspicious emails, inquire about information related to an account of the service provider, and/or other types of inquiry. Based on the user query, the system may determine a plurality of response candidates and select one final response candidate from the determined response candidates. The system may, further, provide the final response candidate to the user as an answer to the user query.

In some embodiments, the system may include a non-transitory memory and one or more hardware processors coupled to the non-transitory memory and configured to read instructions from the non-transitory memory to cause the system to perform operations. The operations may include detecting reception of the user query by a chatbot (also known as a chat robot or simply a bot) or a search engine. Further, the operations may utilize several machine learning models to determine a response to the user query. An augmentation machine learning model may be configured to determine one or more variations of the user query that correspond to a semantic meaning of the user query. A plurality of response candidates may be determined that correspond to the user query by comparing the user query and the one or more variations of the user query to a plurality of documents. A semantic machine learning model may be configured to determine a final response candidate based on performing a semantic comparison between the plurality of response candidates and at least the user query.

In some embodiments, the augmentation machine learning model may be configured to supplement the user query with the one or more variations of the user query (e.g., one or more paraphrases of the user query) by replacing verbs and/or nouns (e.g., the most significant verbs and/or nouns in the user query) with semantically related words (e.g., synonyms). By adding the one or more variations to the user query the augmentation machine learning model performs a query augmentation. The augmentation machine learning model may be trained to determine the one or more variations of the user query such that the one or more variations of the user query are semantically similar to the user query, but are syntactically different from the user query. Further, the one or more variations of the user query may syntactically vary.

The augmentation machine learning model may operate on a language model that is trained on a context corpus to output nontrivial syntactic variants of the user query while retaining the semantics of the user query. In one embodiment, the context corpus may be specific to the service provider. The context corpus may contain words and their synonyms which are often used in the field the service provider is active.

In some embodiments, the step of determining the plurality of response candidates that correspond to the user query may utilize a key-word based approach. For example, a term frequency-inverse document frequency (TD-IDF) process may be used to compare the user query and the one or more variations of the user query to a plurality of documents. The TF-IDF process is a statistical measure that evaluates how relevant a word is to a specific document in the collection of documents. This is done by multiplying two metrics: (i) the term frequency of the word in a document and (ii) the inverse document frequency of the word across the collection of documents. Multiplying these two metrics results in a TF-IDF score of a word in a document. The higher the score, the more relevant that word is in that particular document.

The documents may contain a number of predetermined responses, which could be used for answering user queries. Further, the documents may contain pairs of user queries and the corresponding responses.

In some embodiments, the semantic machine learning model may be embodied to perform a syntactic comparison between the plurality of response candidates and at least the user query in addition to the semantic comparison in order to determine the final response candidate.

The semantic machine learning model may utilize Information Retrieval (IR) and Natural Language Processing (NLP) algorithms for ranking the determined response candidates. In some embodiments, scores may be determined for the plurality of response candidates. When determining scores, semantic similarities of the response candidates to the user query may be weighted more than syntactic similarities of the response candidates to the user query. Thus, response candidates having high semantic similarities to the user query may have higher scores than response candidates having high syntactic similarities, but low semantic similarities to the user query. The higher the score of one of the response candidates, the higher the respective response candidate is ranked. The response candidate having the highest score may be determined as the final response candidate.

In some embodiments, one or more normalization techniques may be utilized to normalize the user query before the augmentation machine learning model determines the one or more variations of the user query. Applying the one or more normalization techniques to the user query may standardize spellings, morphemes and/or verb tenses in the user query thereby reducing trivial syntactic variants. Further, normalizing the user query may include standardizing each word of the user query to its basic word form. The augmentation machine learning model may then determine the one or more variations of the user query that correspond to a semantic meaning of the normalized user query.

The one or more normalization techniques may include a text normalization machine learning model to normalize the user query.

In some embodiments, the chatbot or the search engine may provide the final response candidate to the user as a response to the user query. The chatbot may provide automated assistance to the user in an online chat session. Further, the chatbot may additionally be capable of analyzing the final response candidate and provide a dialogue with the user via an online chat session.

After the final response candidate has been determined for answering a user query received from a user, the user query and the corresponding plurality of response candidates (as determined, e.g., by the TD-IDF process) as well as the final response candidate determined from the plurality of response candidates may be stored in a training database. For each user query, these data (i.e., user query, the corresponding plurality of response candidates and the final response candidate) may be continuously stored in the training database. The data stored in the training database may be used as training data for continuously training the semantic machine learning model. In addition, these data may be used for improving a future search that is customized to the user. During a training process, the semantic machine learning model may examine the user queries and the corresponding response candidates stored in the training database. Certain internal parameters of the semantic machine learning model may be adjusted in order to optimize the ranking capabilities of the semantic machine learning model. The result is an optimized semantic machine learning model that can be used on unknown data.

FIG. 1 illustrates an electronic system 100 within which the system for determining a response to a user query may be implemented according to one embodiment of the disclosure. The electronic system 100 may include a service provider server 110 associated with a service provider and a user device 112 that may be communicatively coupled with each other via a network 114. The network 114, in one embodiment, may be implemented as a single network or a combination of multiple networks. For example, in various embodiments, the network 114 may include the Internet and/or one or more intranets, landline networks, wireless networks, and/or other appropriate types of communication networks. In another example, the network 114 may comprise a wireless telecommunications network (e.g., cellular phone network) adapted to communicate with other communication networks, such as the Internet.

The user device 112, in one embodiment, may be utilized by a user 116 to interact with the service provider server 110 and/or other user devices similar to the user device 112 over the network 114. For example, the user 116 may use the user device 112 to log-in to a user account with the service provider to access account services or conduct electronic transactions (e.g., account transfers or payments, purchase goods and/or services, sales of goods and/or services, receive payments of the sale, etc.) with the service provider server 110. Furthermore, the user 116 represented here may be a natural person, a group of people, a community, and/or a business entity. Examples of business entities include merchant sites, resource information sites, utility sites, real estate management sites, social networking sites, etc., which offer various items for purchase and process payments for the purchases.

The user device 112, in various embodiments, may be implemented using any appropriate combination of hardware and/or software configured for wired and/or wireless communication over the network 114. In various implementations, the user device 112 may include at least one of a wireless cellular phone, wearable computing device, PC, laptop, etc.

The user device 112, in one embodiment, may include a user interface (UI) application 120 (e.g., a web browser), which may be utilized by the user 116 to conduct electronic transactions (e.g., selling, shopping, purchasing, bidding, etc.) with the service provider server 110 over the network 114. In one implementation, the UI application 120 may include a software program, such as a graphical user interface (GUI), executable by a processor that is configured to interface and communicate with the service provider server 110 via the network 114. In another implementation, the UI application 120 may include a browser module that provides a network interface to browse information available over the network 114. For example, the UI application 120 may be implemented, in part, as a web browser to view information available over the network 114.

The user device 112 may also include a chat client 122 for facilitating online chat sessions with a chatbot (e.g., a chatbot 140 of the service provider server 110). The chat client 122 may be a software application executed on the user device 112 for providing a chat client interface for the user 116 and for exchanging (e.g., transmitting and receiving) messages with the chatbot or the other chat client. For example, during an online chat session with the chatbot or the other chat client the chat client 122 may present a chat interface that enables the user 116 to input data (e.g., text data such as user queries, audio data, multi-media data, etc.) for transmitting to the chatbot or the other chat client. The chat interface may also present messages that are received from the chatbot or the other chat client, and messages that have been transmitted to the chatbot or the other chat client. In some embodiments, the messages may be presented on the chat client interface in a chronological order according to a chat flow of the online chat session. The chat client 122 may be an embedded application that is embedded within another application, such as the UI application 120. Alternatively, the chat client 122 may be a stand-alone chat client program (e.g., a mobile app such as WhatsApp®, Facebook® Messenger, iMessages®, etc.) that is detached from any other software applications executed on the user device 112.

The user device 112, in various embodiments, may include other applications 124 as may be desired in one or more embodiments of the present disclosure to provide additional features available to the user 116. For example, the applications 124 may include security applications for implementing client-side security features, programmatic client applications for interfacing with appropriate application programming interfaces (APIs) over the network 114, and/or various other types of generally known programs and/or software applications. In still other examples, the other applications 124 may interface with the UI application 120 for improved efficiency and convenience.

The user device 112, in one embodiment, may include at least one identifier 126, which may be implemented, for example, as operating system registry entries, cookies associated with the UI application 120, identifiers associated with hardware of the user device 112 (e.g., a media control access (MAC) address), or various other appropriate identifiers. The identifier 126 may include one or more attributes related to the user 116 of the user device 112, such as personal information related to the user 116 (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 126 may be embedded within messages transmitted to other chat clients (e.g., the chatbot 140 or other chat clients) via an online chat session, and the identifier 126 may be used by the service provider server 110 to associate the user 116 with a particular user account maintained by the service provider server 110.

In various implementations, the user 116 is able to input data and information into an input component (e.g., a keyboard) of the user device 112 to provide user information with a transaction request, such as a login request, a fund transfer request, a request for adding an additional funding source (e.g., a new credit card), or other types of request. The user information may include user identification information.

Even though only one user device 112 is shown in FIG. 1, it has been contemplated that one or more user devices (each similar to user device 112) may be communicatively coupled with the service provider server 110 via the network 114 within the system 100.

The service provider server 110, in one embodiment, may be maintained by an online service provider, which may provide services (e.g., selling of merchandise processing, performing electronic transactions, etc.). As such, the service provider server 110 may include a service application 130, which may be adapted to interact with the user devices (such as the user device 112) over the network 114 to facilitate the searching, selection, purchase, payment of items, and/or other services offered by the service provider server 110. In one example, the service provider server 110 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 130 may include a payment processing application (not shown) for processing purchases and/or payments for electronic transactions between a user and a merchant or between any two entities. In one embodiment, the payment processing application may assist with resolving electronic transactions through validation, delivery, and settlement. As such, the payment processing application may settle indebtedness between a user and a merchant, wherein accounts may be directly and/or automatically debited and/or credited of monetary funds in a manner as accepted by the banking industry.

The service provider server 110 may also include a web server 132 that is configured to serve web content to users in response to HTTP requests. As such, the web server 132 may include pre-generated web content ready to be served to users. For example, the web server 132 may store a log-in page, and may be configured to serve the log-in page to users for logging into user accounts of the users to access various services provided by the service provider server 110. The web server 132 may also include other webpages associated with the different services offered by the service provider server 110. As a result, a user (e.g., the user 116) may access a user account associated with the user and access various services offered by the service provider server 110, by generating HTTP requests directed at the service provider server 110.

The service provider server 110, in one embodiment, may be configured to maintain one or more user accounts (e.g., a buyer account, a seller account, etc.) in an accounts database 134, each of which may include account information associated with one or more users (e.g., the user 116 associated with user device 112). For example, account information may include private financial information of users and merchants, such as one or more account numbers, passwords, credit card information, banking information, digital wallets used, transaction history, or other types of financial information. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 110, and the user may have credentials to authenticate or verify identity with the service provider server 110. User attributes may include personal information, banking information and/or funding sources. In various aspects, the user attributes may be passed to the service provider server 110 as part of a login, search, selection, purchase, and/or payment request, and the user attributes may be utilized by the service provider server 110 to associate the user with one or more particular user accounts maintained by the service provider server 110.

The service provider server 110 may also include a determination module 136 that implements the functionality of the system for determining a response to a user query as disclosed herein. In some embodiments, the determination module 136 includes a non-transitory memory and one or more hardware processors coupled to the non-transitory memory and configured to read instructions from the non-transitory memory to cause the system to perform operations. The operations may include determining variations of a user query that has been received from a user (e.g., the user 116), wherein the variations correspond to a semantic meaning of the user query. Further, the operations may include determining a plurality of response candidates that correspond to the user query, wherein the response candidates are determined by comparing the user query and the variations of the user query to documents. The operations may further include selecting a final response candidate from the determined response candidates, wherein the final response candidate is determined by performing a semantic comparison between the response candidates and the user query. Further functionalities of the determination module 136 are described further below in connection with FIG. 2.

In one embodiment, the service provider server 110 may also include the chatbot 140 that may generate and transmit messages to a chat client (e.g., the chat client 122) and view messages generated by the chat client. The messages generated and transmitted by the chatbot 140 may include content generated by the determination module 136. Further, the chatbot 140 may receive user queries sent by the user 116 via the chat client 122. The chatbot 140 may inform the determination module 136 when the chatbot 140 receives a user query.

In one embodiment, the chatbot 140 may not be included in the service provider server 110, but in a device located external from the service provider server 110. This external device may be communicatively coupled with the service provider server 110 directly or via an internal network associated with the service provider.

In one embodiment, the service provider server 110 may include or may be coupled to a search engine. The user 116 may input the user query into a search box provided, for example, by the UI application 120. The user query may be sent to the search engine over the network 114 and may be forwarded to the determination module 136. In this embodiment, the service provider server 110 may not include the chatbot 140.

Figure 2:
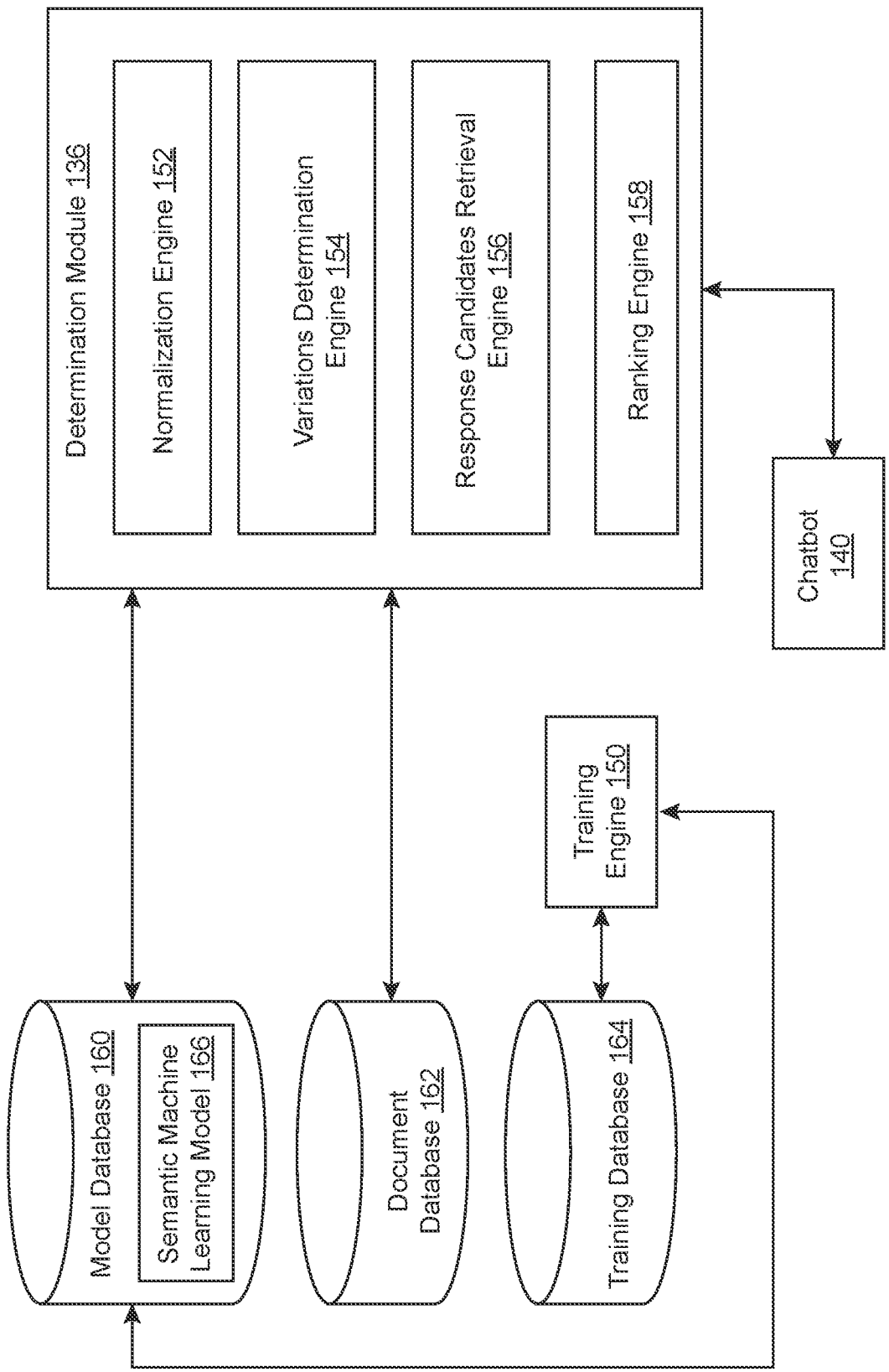
FIG. 2 is a block diagram illustrating a determination module according to an embodiment of the present disclosure.

FIG. 2 illustrates a block diagram of the determination module 136 according to an embodiment of the disclosure. The determination module 136 may include a normalization engine 152, a variations determination engine 154, a response candidates retrieval engine 156 and a ranking engine 158. The determination module 136 may be communicatively coupled with a model database 160 and a document database 162 directly or via an internal network associated with the service provider. The determination module 136 may further be communicatively coupled with the chatbot 140. In addition, a training engine 150 may be communicatively coupled with the model database 160 and a training database 164.

The normalization engine 152, the variations determination engine 154 and the ranking engine 158 may be machine learning model computation engines. Corresponding trained or pretrained machine learning models may be stored in the model database 160. The model database 160 may, for example, contain a ranking machine learning model 166 as discussed below. Other machine learning models, such as one or more of the machine learning models discussed below, may also be stored in the model database 160. At start up of the determination module 136, each of the normalization engine 152, the variations determination engine 154 and the ranking engine 158 may load its corresponding machine learning model from the model database 160.

The response candidates retrieval engine 156 may utilize a term frequency-inverse document frequency (TD-IDF) model. The TD-IDF model may also be stored in the model database 160 and may be loaded by the response candidates retrieval engine 156 at the start up. In some embodiments, the TD-IDF model may be permanently stored in the response candidates retrieval engine 156.

When the chatbot 140 or the search engine receives of a user query transmitted by the user 116 via the chat client 122, the user query may be forwarded to the normalization engine 152. The normalization engine 152 may utilize a text normalization machine learning model loaded from the model database 160 to normalize the user query. In some embodiments, the normalization engine 152 may standardize spellings, morphemes and/or verb tenses in the user query. In some embodiments, the normalization engine 152 may standardize each word of the user query to its basic word form.

The variations determination engine 154 may receive the normalized version of the user query from the normalization engine 152. In some embodiments, the variations determination engine 154 may utilize an augmentation machine learning model loaded from the model database 160 that is trained to supplement the normalized user query with the one or more variations of the user query that correspond to a semantic meaning of the user query. In some embodiments, the variations of the user query are paraphrases of the user query, in which the most significant verbs and/or nouns of the user query are replaced with semantically related words (e.g., synonyms).

The normalized user query and the one or more variations of the normalized user query may be fed to the response candidates retrieval engine 156. The response candidates retrieval engine 156 may compare the normalized user query and the one or more variations of the normalized user query to a plurality of documents, which are stored in the document database 162. The documents may contain responses, which could be used for answering user queries. In some embodiments, the documents may contain preprocessed pairs of user queries and the corresponding responses. The response candidates retrieval engine 156 may utilize the TD-IDF model to determine a plurality of response candidates from the documents that may answer the user query.

The ranking engine 158 may receive the plurality of response candidates from the response candidates retrieval engine 156. The ranking engine 158 may utilize a semantic machine learning model loaded from the model database 160 to perform a semantic comparison between the plurality of response candidates and the user query. In one embodiment, the semantic machine learning model may utilize Information Retrieval (IR) and Natural Language Processing (NLP) algorithms for ranking the determined response candidates. In one embodiment, the semantic machine learning model may include a pre-trained language model, which may be based on a Bidirectional Encoder Representations from Transformers (BERT) model or any other suitable conventional pre-trained language model. The BERT model is a deep learning natural language model pre-trained on a large corpus that analyzes a phrase (e.g., a sentence, a question, etc.) as a whole regardless of a directional flow of the words (see Jacob Devlin, Ming-Wei Chang, Kenton Lee, and Kristina Toutanova. Bert: "Pre-training of deep bidirectional transformers for language understanding", Proceedings of the 2019 Conference of the North American Chapter of the Association for Computational Linguistics: Human Language Technologies, Volume 1 (Long and Short Papers), pp. 4171-4186, 2019, which is incorporated herein by reference in its entirety). The BERT model may rank the response candidates determined by the TD-IDF model. In some embodiments, scores may be determined for the response candidates by the BERT model. The higher the score of one of the response candidates, the higher the respective response candidate may be ranked. Another ranking algorithm may be used for fine-tuning the results obtained from the BERT model. In one embodiment, a lambda ranking objective algorithm, which may be ranking objective LambdaRank (see Christopher J. C. Burges, "From RankNet to LambdaRank to LambdaMART: An Overview", Microsoft Research Technical Report MSR-TR-2010-82, which is incorporated herein by reference in its entirety), may receive the ranking prediction from the BERT model and may fine-tune this ranking prediction. Thus, the positions of some or all of the response candidates in the ranking list may be changed by the lambda ranking objective algorithm. In one embodiment, the lambda ranking objective algorithm may fine-tune the scores of the response candidates.

The response candidate having the highest score may be determined as the final response candidate.

In some embodiments, the final response candidate having the highest score may be provided to the chatbot 140. The chatbot 140 may transmit the final response candidate to the chat client 122 of the user device 112 as a response to the user query. The user device 112 may inform the user 116 about the received response. For example, the response may be shown on a display of the user device 112.

In some embodiments, during offline workflow the user query obtained from the user 116 together with the final response candidate determined as an answer to the user query may be pushed into a raw user query-response database. These data may be then processed and stored as a new training data set in the training database 164. Further, other training data sets obtained from other sources may also be stored in the training database 164. During offline workflow, the training engine 150 may use the training data sets stored in the training database 164 to continuously train the machine learning models stored in the model database 160. After the training the machine learning models are stored in the model database 160. During online workflow, the trained machine learning models can be utilized by the normalization engine 152, the variations determination engine 154 and/or the ranking engine 158.

The training engine 150 may continue to accumulate new training data sets and store these training data sets in the training database 164. Since the new training data sets are generated automatically without requiring a human to manually inspect the responses determined for the user queries, new training data sets can be generated in a cost-efficient manner. By continually generating new training data sets automatically and training the machine learning models, the performance of the determination module 136 will be gradually improved.

Figure 3:
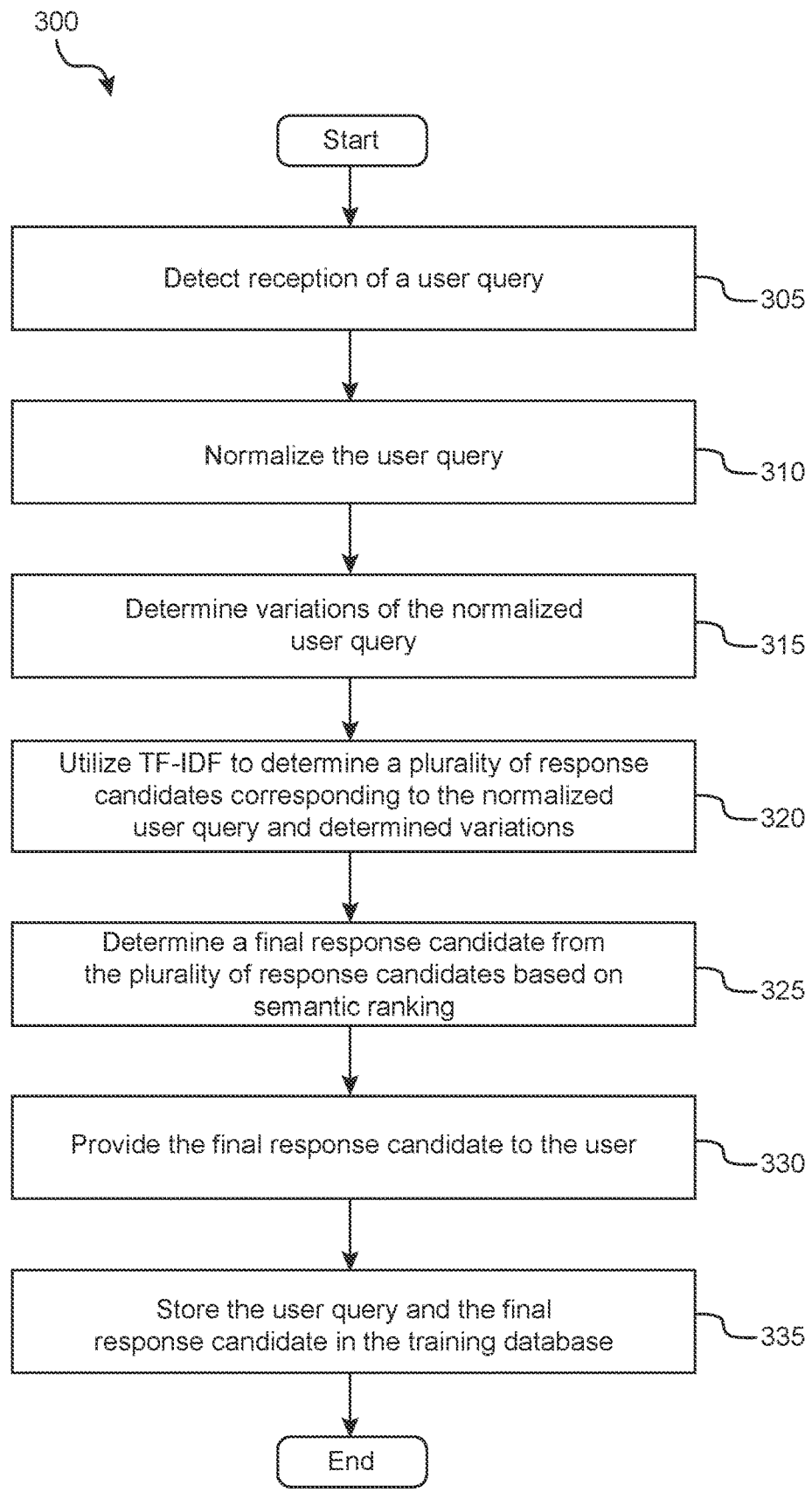
FIG. 3 is a flowchart showing a method for determining a response to a user query according to an embodiment of the present disclosure.

FIG. 3 illustrates a method 300 for determining a response to a user query according to various embodiments of the disclosure. In some embodiments, the method 300 may be performed by the determination module 136. The method 300 begins by detecting reception of a user query by the chatbot 140 or the search engine at step 305. For example, a user, such as the user 116, may use the chat interface of the chat client 122 or the UI application 120 executed on the user device 112 to send the user query to the service provider which is received by the chatbot 140.

When a user sends a query to the service provider, the user may, for example, want to inquire about a product or service offered by the service provider, inquire about information (e.g., a status, etc.) related to a transaction (e.g., a payment transaction, a fund transfer transaction, a refund transaction, an account creation transaction, etc.), file a dispute, cancel an order or a payment, query for suspicious emails, inquire about information related to an account of the service provider, and/or other types of inquiry.

Language as used in the user query is by nature evolving with slang words and phrases that typically cannot be found in a standard dictionary, but is used in an informal context such as text messages. These syntactic variants are not simply unintentional mistakes, but also deliberate abbreviations to allow the user to express rich and informative content using only a few characters. Inputs to NLP systems often require standardization of morphemes, tenses and spelling variants in order to enhance machine understanding and processing capacity (see I. Guyon, N. Matić, and V Vapnik: "Discovering informative patterns and data cleaning", Proceedings of the 3rd International Conference on Knowledge Discovery and Data Mining, pp. 145-156, 1994; and Erhard Rahm and Hong Hai Do: "Data cleaning: Problems and current approaches", 2000, which are incorporated herein by reference in their entirety).

For example, in many community discussions, user input queries may often be not clear and may contain morpheme, tense and spelling variants. Consider the user query "how could I transfer balanse from my account to another accont" shown below in Table 1. The user query contains the morpheme variants "transfer-transferring" and also misspelling variants "balanse-balance" and "accont-account".

TABLE 1

| User query | how could I transfer balanse from my account to another accont? |
|---|---|
| Variant of the user query | how does transferring balances from my account to another account work? |

When searching for an answer to this query using a key-word matching retrieval, the original user query creates problems as the non-standard syntactic variants are either fully ignored if they are not in the system vocabulary or mapped to an unrelated term.

The method 300 may include utilizing a normalization technique to normalize the user query at step 310. The normalization technique may be based on a context-aware and deep language understanding. For example, the normalization technique may be based on a text normalization machine learning model.

In some embodiments, the normalization technique may standardize each word to its basic word form. An example for standardizing each word to its basic word form is illustrated in Table 2.

TABLE 2

| User query | how does transferring balanses from my account to another accont work? |
|---|---|
| Normalized user query | how do transfer balance from my account to another account work? |

In the give example, the input user query "how does transferring balanses from my account to another accont work?" is normalized by replacing each word with its normalized basic word form (see "does-do", "transferring-transfer", "balanses-balance" and "accont-account"). Text normalization helps to correct and simplify the syntactic variance, therefore improving the syntactic understanding of language.

At step 315, one or more variations of the normalized user query that correspond to a semantic meaning of the user query may be determined by utilizing an augmentation machine learning model.

In some embodiments, the variations of the user query may be generated by replacing the verbs and/or nouns in the normalized user query with synonyms. By doing this the syntactics of the user query is diversified but its semantics is retained. For example, the user may ask "get refund to account". With the help of the augmentation machine learning model, several variations of this sentence could be generated as illustrated in Table 3.

TABLE 3

| User query | get refund to account |
|---|---|
| Variations of the user query | get reimbursement to account |
| | get refund to account |
| | get refund to balance |

The paraphrases of the original user query shown in Table 3 syntactically vary while being semantically consistent.

Figure 4:
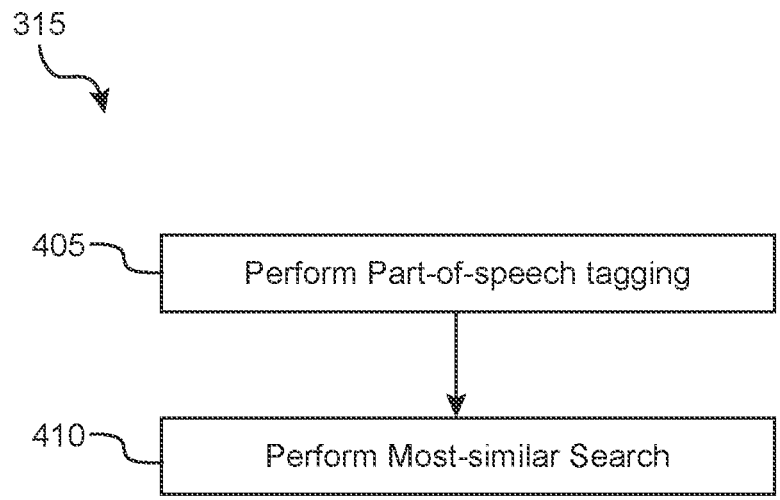
FIG. 4 is a flowchart showing a method for determining variations of a normalized user query according to an embodiment of the present disclosure.

In some embodiments, the step 315 of the method 300 may include steps 405 and 410 illustrated in FIG. 4.

At step 405, Part-of-speech (POS) tagging may be performed (see https://www.sketchengine.eu/pos-tags/). POS tagging labels each token in the user query with a POS tag. POS tags can be, for example, [NOUN], [PROPER NOUN], [VERB], [ARTICLE], [ADJECTIVE], [ADPOSITION], [PREPOSITION], [PRONOUN], [ADVERB], [CONJUNCTION], [INTERJECTION], etc. The performance of POS tagging is exemplarily illustrated in Table 4.

TABLE 4

| User query | get | refund | to | account |
|---|---|---|---|---|
| POS tags | [VERB] | [NOUN] | [ADPOSITION] | [NOUN] |

At step 410, the augmentation machine learning model may be utilized to carry out Most-similar Search by Word Embedding. Most-similar Search finds the most semantically related word to the input token by comparing their learned representations as multi-dimensional vectors. These vectors may be learned via Distributed Word-embedding technique (see Tomas Mikolov, Ilya Sutskever, Kai Chen, Greg S Corrado, and Jeff Dean: "Distributed representations of words and phrases and their compositionality", Advances in neural information processing systems, pp. 3111-3119, 2013, which is incorporated herein by reference in its entirety).

In some embodiments, input tokens to the Most-similar Search may only include tokens whose POS tag is [VERB] and/or [NOUN]. In the example shown in Table 4, such input tokens are "get", "refund" and "account".

Instead of utilising versions of the augmentation machine learning model trained on a general corpus, the word representations may be trained on data, which contain vocabulary (e.g., product names, feature names, etc.) specific to the field of the service provider. This may help the augmentation machine learning model to disambiguate homonyms and correct misspellings by being aware of the context. For example, a phrase such as "balance" in general means "an even distribution of weight" and is paraphrased as "stability". However, in the context of a service provider that is active in the field of payment transactions, "balance" means "the amount of money in accounts" and should be paraphrased as "credit". By training the word presentations on a corpus specific to the service provider, the augmentation machine learning model may learn the correct paraphrase.

In some embodiments, word-embedding nearest neighbor mapping may be used to find variations of a word. Examples of variations of words found by using word-embedding nearest neighbor mapping are illustrated in Table 5.

TABLE 5

| Original word | Nearest neighbor |
|---|---|
| refund | reimbursement |
| refund | payment |
| account | value |
| money | credit |

By incorporating variants of word embedding such as misspelling oblivious word embeddings (MOE) paraphrase misspellings may be corrected into the correct spellings (see Aleksandra Piktus, Necati Bora Edizel, Piotr Bojanowski, Édouard Grave, Rui Ferreira, and Fabrizio Silvestri: "Misspelling oblivious word embeddings", Proceedings of the 2019 Conference of the North American Chapter of the Association for Computational Linguistics: Human Language Technologies, Volume 1 (Long and Short Papers), pp. 3226-3234, 2019, which is incorporated herein by reference in its entirety).

Returning to FIG. 3, the normalized user query together with its variations determined in step 315 or 410 may be input into a key-word based retrieval algorithm (e.g., a TF-IDF process) at step 320. The algorithm may be used to compare the normalized user query and the variations of the normalized user query to the documents, which are stored in the document database 162 and may contain preprocessed queries and corresponding answers. As a result of step 320, a plurality of response candidates may be found that correspond to the user query.

Advanced ranking solutions improve the accuracy of the top retrieved answers, but their run-time scales at least linearly with the number of candidate responses. To avoid the retrieval bottleneck introduced by the ranking component, the candidate responses may be narrowed down using an efficient Syntactic Retrieval engine that leverages existing search solutions such as Elastic Search (see https://www.elastic.co/) or Apache Lucene (see https://lucene.apache.org/).

At step 325, a final response candidate may be determined based on utilizing a semantic machine learning model to perform a semantic comparison between the response candidates determined at step 320 and the user query.

Figure 5:
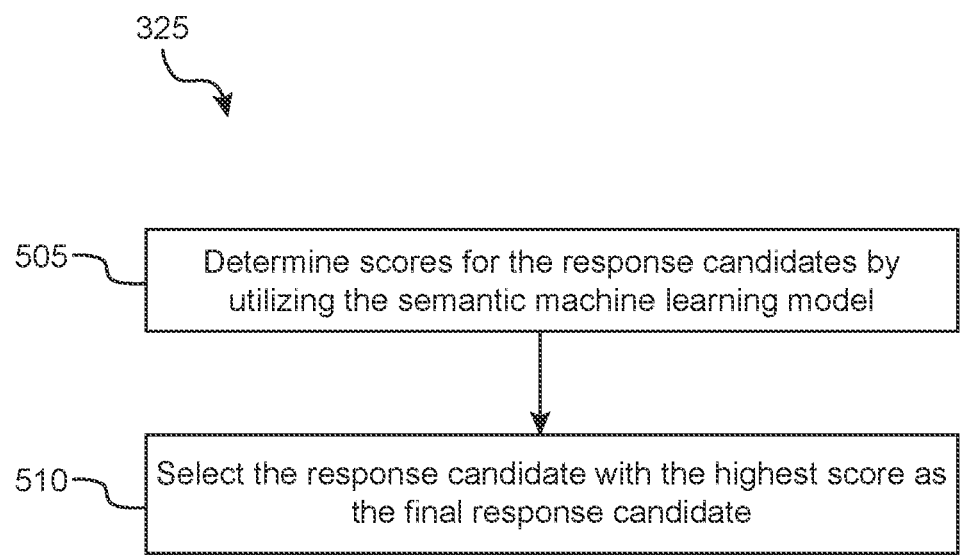
FIG. 5 is a flowchart showing a method for determining a final response candidate according to an embodiment of the present disclosure.

In some embodiments, the step 325 of the method 300 may include steps 505 and 510 illustrated in FIG. 5.

At step 505, the semantic machine learning model is utilized to determining scores for the response candidates determined at step 320. When determining scores for the plurality of response candidates, semantic similarities of the response candidates to the user query may be weighted more than syntactic similarities of the response candidates to the user query. The score of a response candidate may show the relevance of the respective response candidate.

An example of a user query and three response candidates is illustrated in Table 6.

TABLE 6

| User query | Transfer to Bank Account Completed but not in my bank? | Score |
|---|---|---|
| Correct response | When you initiate the verification process on your bank account through your account, it takes between 2 and 3 working days for the amounts to appear in your bank account. | 2 |
| Relevant response | If you are unable to locate the deposit in your bank account and the status of the transaction is still 'Completed' in your account history, we can trace your withdrawal once 14 working days have passed. | 1 |
| Irrelevant response | You can't add a local bank account in your country. | 0 |

In the example shown in Table 6 the only overlapping phrase between the user query and the three response candidates is "bank account". However, among the three response candidates, there is an irrelevant response, a relevant response and a correct response. The semantic machine learning model is trained to have a deep understanding of the user query and to provide scores according to the relevance of the respective answer. As can be seen from Table 3, the irrelevant response has the score '0', the relevant response has the score '1' and the correct response has the score '2'. Thus, the response candidate having the highest relevance has the highest score.

At step 510, the response candidate having the highest score may be selected as the final response candidate.

Returning to FIG. 3, the final response candidate determined in step 325 or 510 may be provided to the user 116 as an answer to the user query by the chatbot 140 at step 330.

At step 335, the user query obtained from the user 116 together with the final response candidate may be stored as a new training data set in the training database 164. The training data sets stored in the training database 164 may be used to continuously train one or more of the machine learning models utilized in the method 300.

In some embodiments, other interfaces rather than the chat interface may be utilized to enable the user 116 to send the user query to and to communicate with the service provider server 110. In one embodiment, the UI application 120 may be utilized by the user 116 to send a user query to the service provider server 110 over the network 114.

In one embodiment, the user 116 may receive a response page from the service provider server 110 in response to the user query. The response page may include a listing of responses that are returned by the determination module 136 in response to the user query. The responses may be ranked by relevance to the user query. In one embodiment, the response page may include a number of response candidates retrieved by the TF-IDF process. Further, the response candidates may be ranked such that the most relevant response candidate is listed at the top of the response page. The ranking of the response candidates may be carried out by the semantic machine learning model.

In one embodiment, a program, such as the chatbot 140, may monitor user activity to create a user query. For example, the program may monitor a user's activity on a help center page that provides a list of frequently asked questions (FAQs) and answers to the FAQs. One of the sources for the FAQs may be online discussion communities. The program may monitor which FAQs have been viewed or selected within a certain time period. The program may then utilize information corresponding to the FAQs viewed/selected by the user 116 to create one or more user queries. The augmentation machine learning model may be utilized to supplement each user query with one or more variations of the respective user query. Further, in a similar manner as described above, the TF-IDF process may determine a plurality of response candidates corresponding to each user query and the variations determined for the respective user query. From the plurality of response candidates a final response candidate may be determined by means of the semantic machine learning model. The final response candidate may be provided to the user 116. In one embodiment, several of the response candidates determined by the TF-IDF process may be provided to the user 116. The user 116 may receive a response page that includes a listing of the response candidates. The response candidates may be ranked in the order determined by the semantic machine learning model. In one embodiment, the answers to the FAQs provided by the help center page may be utilized as ground truth to train the semantic machine learning model.

In one embodiment, the method disclosed herein may not only be used for determining a final response candidate for a user query, but also for providing one or more suggested search queries to the user 116, from which the user 116 can select. When the user 116 inputs a user query, such as a search input into a search field, or a portion of a search input into a search field, the method disclosed herein is first utilized for determining a final response candidate to this user query. A program, such as the chatbot 114 or any other suitable program, may receive the final response candidate determined by the semantic machine learning model and may determine one or more suggested search queries from the final response candidate. The one or more suggested search queries may be displayed in a drop-down menu (also known as a drop menu, pull-down list or picklist) on a graphical user interface of the UI application 120. When the drop-down menu is displayed, a graphical control element may be activated that allows the user 116 to choose one of the suggested search queries.

Figure 6:
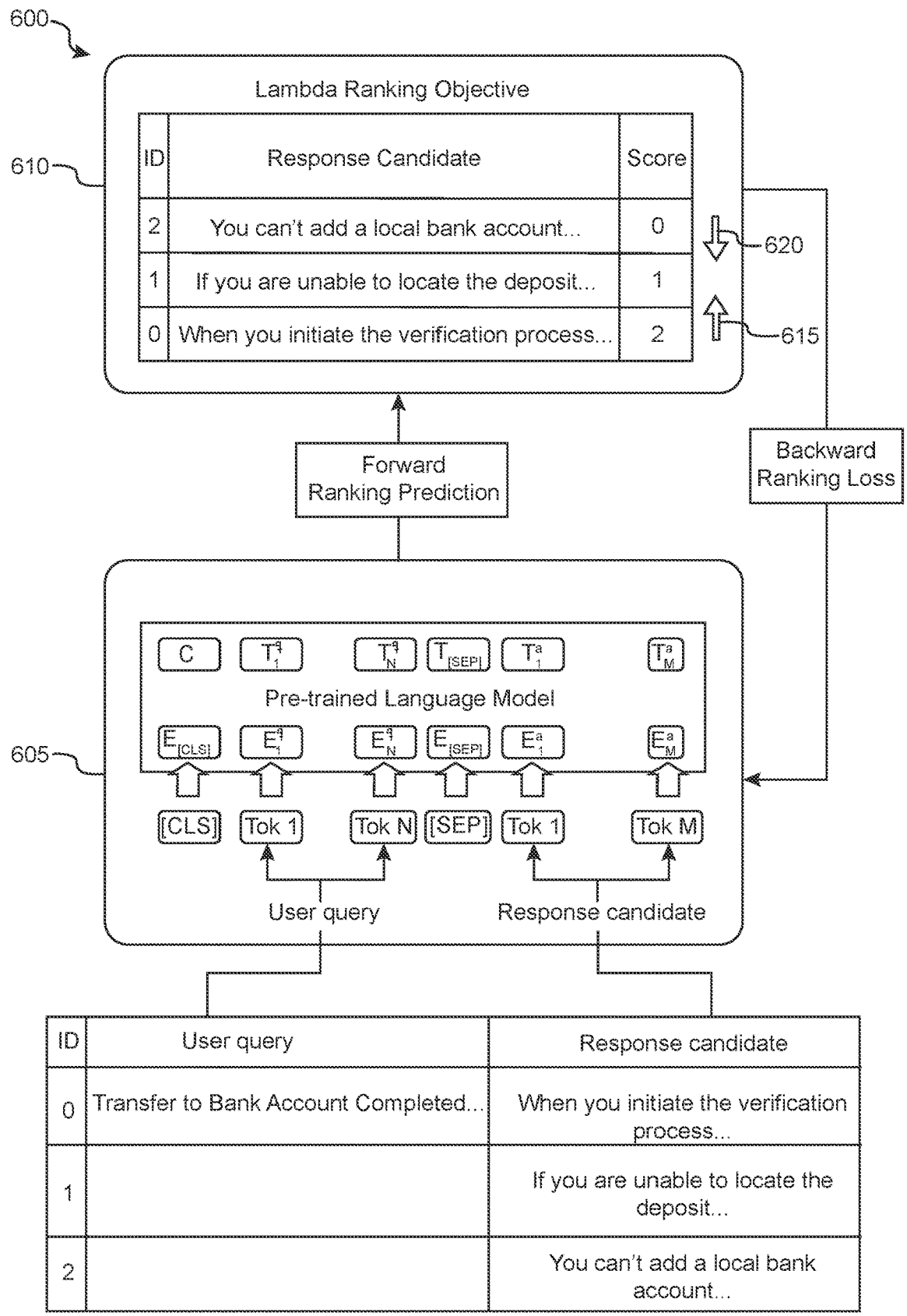
FIG. 6 is a block diagram illustrating the architecture of a model for ranking response candidates and determining a final response candidate according to an embodiment of the present disclosure.

FIG. 6 schematically illustrates the architecture of a model 600 that may be used for ranking the response candidates and determining the final response candidate. In some embodiments, the model of FIG. 6 may be used in step 325 or in steps 505 and 510 of the method 300 in order to rank the response candidates determined in step 320 and select the final response candidate.

The ranking task may be defined as a supervised learning to rank problem. A training instance is a (q, a, y) tuple. $x^q$ is the textual representation of user query q∈Q as a word sequence $x^q = \{x_1^q; x_2^q; \ldots; x_N^q\}$ of size N. a∈A is a list of response candidates a = {$a_1$; $a_2$; . . . }, where $a_i = \{x_{i,1}^a; x_{i,2}^a; \ldots; x_{i,M}^a\}$ is also a word sequence of size M. y∈Y is a sorted list of true ranking labels of size |a| in the order such that $y_1$ is the most relevant response candidate and $y_{\|a\|-1}$ is the least relevant response candidate amongst all response candidates a. The task is to output a correct ranking of response candidates a that have been determined for the user query q, by learning a function $f^*: Q \times A \rightarrow Y$ from the list of labelled ranking examples.

The model 600 may include a pre-trained language model 605, which may be based on a BERT model (see Jacob Devlin, Ming-Wei Chang, Kenton Lee, and Kristina Toutanova. Bert: "Pre-training of deep bidirectional transformers for language understanding", Proceedings of the 2019 Conference of the North American Chapter of the Association for Computational Linguistics: Human Language Technologies, Volume 1 (Long and Short Papers), pp. 4171-4186, 2019). The BERT model may be adapted to the ranking problem by fine-tuning with a lambda ranking objective algorithm 610, which may be ranking objective LambdaRank (see Christopher J. C. Burges, "From RankNet to LambdaRank to LambdaMART: An Overview", Microsoft Research Technical Report MSR-TR-2010-82).

During training a pair of a user query q and one of its response candidates a may be passed through the language model 605 that may be pre-trained on a self-supervised sentence pair classification task, typically next sentence prediction, to obtain a single score that reflects the semantic relationship between the user query q and the response candidate $a_i$. Passing all user query-response candidate pairs in the response candidate list to the language model 605 can be seen as applying a transformation function $f:Q \times A \to \mathbb{R}^{|a|}$. Ordering each candidate response $a_i$ by $f(q, a_i)$ gives a sorted list $\hat{y}$, which is the output ranking list of the language model 605. The difference of the output ranking list $\hat{y}$ and the true ranking list y may be measured via a loss function $L(\hat{y}, y)$. $f$ may be adjusted accordingly based on the loss feedback or propagation. This allows to better approximate the true ranking function $f^*$.

Following LambdaRank (see Christopher J. C. Burges, "From RankNet to LambdaRank to LambdaMART: An Overview", Microsoft Research Technical Report MSR-TR-2010-82) the ranking loss may be approximated and propagated back to the language model 605. Specifically, for each user query-response candidate pair (q, $a_i$) obtained from the user query and its response candidates, the direction of update for the respective response candidate $a_i$ with respect to the pair-wise loss between the response candidate and other response candidates may be measured. For example, according to the forward ranking prediction of the language model 605 as exemplarily shown in FIG. 6, the loss incurred by the current position of the response candidate with ID 0 (i.e., $a_0$) is high as it has a score of 2 and should be ranked above the other response candidates with IDs 1 and 2 (i.e., $a_1$ and $a_2$). Therefore, the transformation function $f$ may be updated such that $f(a_0) > f(a_1)$ and $f(a_0) > f(a_2)$. This means that the direction of update for $a_0$ is positive as indicated by an upward arrow 615 in FIG. 6. Further, the direction of update for $a_2$ with a score of 0 is negative as indicated by a downward arrow 620 in FIG. 6.

The gradient update may be scaled by the total difference in normalized Discounted Cumulative Gain or $\Sigma \Delta nDCG$ between the current ranking and the ranking obtained when swapping the response candidates $a_i$ with each other. The scaling techniques are shown in LambdaRank (see Christopher J. C. Burges, "From RankNet to LambdaRank to LambdaMART: An Overview", Microsoft Research Technical Report MSR-TR-2010-82) to achieve a higher nDCG metric as it directly considers nDCG gain while optimizing for the ranking function. Experiments have shown that a model such as the model 600 may outperform baseline key-word based retrieval by 7.8 times in terms of Mean Reciprocal Rank (see Alex Wang, Amanpreet Singh, Julian Michael, Felix Hill, Omer Levy, and Samuel Bowman: "Glue: A multi-task benchmark and analysis platform for natural language understanding", Proceedings of the 2018 EMNLP Workshop BlackboxNLP: Analyzing and Interpreting Neural Networks for NLP, pp. 353-355, 2018, which is incorporated herein by reference in its entirety).

Figure 7:
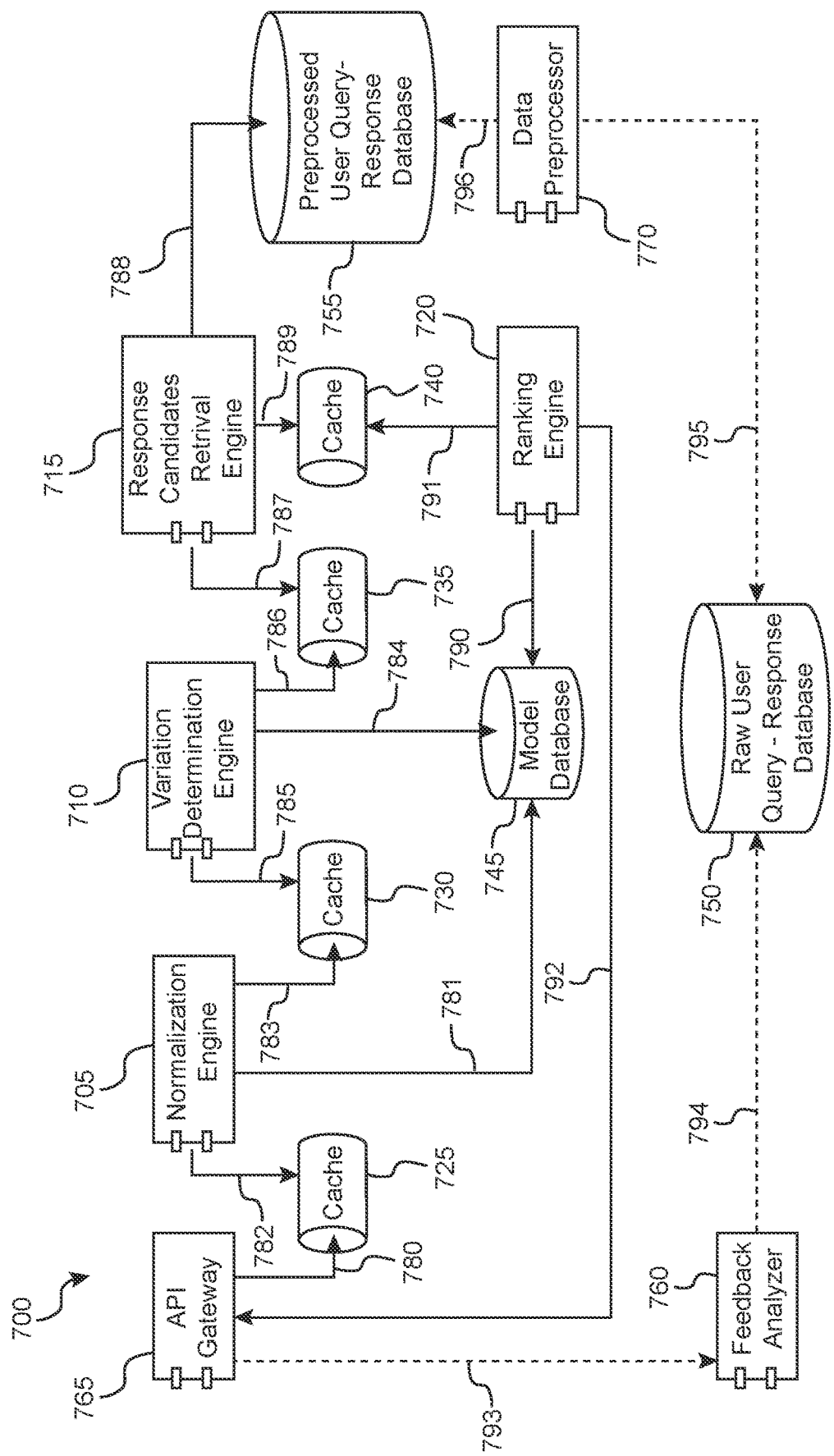
FIG. 7 is a block diagram illustrating a pipeline architecture for determining a response to a user query according to an embodiment of the present disclosure.

FIG. 7 illustrates a pipeline architecture 700 within which the system for determining a response to a user query may be implemented according to one embodiment of the disclosure. The pipeline connects different machine learning model computation engines and other computation engines, which are different from each other in both throughput and latency. In some embodiments, the pipeline architecture 700 may include a normalization engine 705, a variations determination engine 710, a response candidates retrieval engine 715 and a ranking engine 720. In order to enable non-blocking processing for the whole pipeline, different memory data caches are introduced between the engines. In some embodiments, the pipeline architecture 700 may include data caches 725, 730, 735 and 740 as shown in FIG. 7.

At start up, each machine learning model computation engine may pre-load its corresponding machine learning model from a model database 745 and initiate connections to its input data cache and its output data cache.

The data caches 725, 730, 735 and 740 may be essentially message queues which, in general, operate in producer/consumer pushes/pulls models. The producer actively pushes a new record to the queue. The consumer listens on the queue and sleeps when the queue is empty, but wakes up whenever there is a new record being pushed to its input queue. The consumer actively pulls new records from its input queue in a chronological order.

In the pipeline architecture 700, each of the engines 705, 710, 715 and 720 is the producer of its output data cache/queue, and is the consumer of its input data cache/queue.

The asynchronous architecture not only orchestrates efficiently multiple engines/services with different throughputs to work together without blocking each other, but also decouples these engines/services from each other. Each component can be easily plugged-in/plugged-out from the whole workflow for upgrading/bench-marking without causing negative impacts on the other components.

In online flow that is indicated in FIG. 7 by arrows with solid lines, the pre-trained machine learning models may be pre-loaded into their machine learning model computation engines. In offline flow that is indicated in FIG. 7 by arrows with dashed lines, new data and feedbacks from users and/or external services of the models may be continuously collected. These feedbacks may be taken into consideration and fed to the original datasets to periodically train the machine learning models. This feedback architecture ensures that the machine learning models are always catching up with new data and constantly being improved.

In some embodiments, the architecture 700 may include a raw user query-response database 750, which is connected to and updated by a feedback analyzer 760. The raw user query-response database 750 may also be updated by an external user query-response forum. Further, the architecture 700 may include a preprocessed user query-response database 755, which stores preprocessed user queries and corresponding responses to adapt to the response candidates retrieval engine 715.

In some embodiments, the architecture 700 may include an API gateway 765 that provides application programming interface (API) endpoints to users and/or external services, and a data preprocessor 770 that preprocesses raw user query-response records in batch and feeds the preprocessed results to the preprocessed user query-response database 755.

During online workflow, the API gateway 765 may receive and validate user queries, for example from a chatbot or a search engine, and may feed the original raw user queries into the data cache 725 (see arrow 780 in FIG. 7).

Further, at start up, the normalization engine 705 may preload a text normalization machine learning model from the model database 745 (see arrow 781) and may listen on the data cache 725. The normalization engine 705 may load records from the data cache 725 in chronological order (see arrow 782), normalize them and push the results to the data cache 730 (see arrow 783).

The variations determination engine 710 may preload an augmentation machine learning model at start up (see arrow 784) and listen on the data cache 730. The variations determination engine 710 may load normalized user queries from the data cache 730 in chronological order (see arrow 785), supplement each normalized user query with variations that correspond to a semantic meaning of the respective user query and push both the original normalized user query and its variations to the data cache 735 (see arrow 786).

The response candidate retrieval engine 715 may listen on the data cache 735 and load the user query together with its semantic augmented variations in chronological order (see arrow 787). The response candidate retrieval engine 715 may retrieve the top N response candidates from the preprocessed user query-response database 755 (see arrow 788) and then push these response candidates to the data cache 740 (see arrow 789).

The ranking engine 720 may preload a semantic machine learning model from the model database 745 at start up (see arrow 790). Further, the ranking engine 720 may listen on the data cache 740 and load the response candidates for each user query in chronological order (see arrow 791), compute the semantic machine learning model to rank the response candidates based on semantics and syntactic similarities and then return the highest ranked response candidate to the API gateway 765 as the final response candidate (see arrow 792).

During offline workflow, the feedback analyzer 760 may receive feedbacks (for example, vote, kudos, etc.) from users through the API gateway 765 (see arrow 793), analyze the feedbacks and feed the results to the raw user query-response database 750 (see arrow 794).

The data preprocessor 770 may provide a batch service which periodically fetches raw user queries and corresponding responses from the raw user query-response database 750 (see arrow 795), clean the user queries and corresponding responses (for example, remove html tag, remove empty values, etc.) and feed the processed results into the preprocessed user query-response database 755 (see arrow 796).

The asynchronous serving pipeline architecture 700 may effectively orchestrate various machine learning models and services. This architecture may also help to shorten the development time, enable easy maintenance, bench-marking and testing performance of each component.

Figure 8:
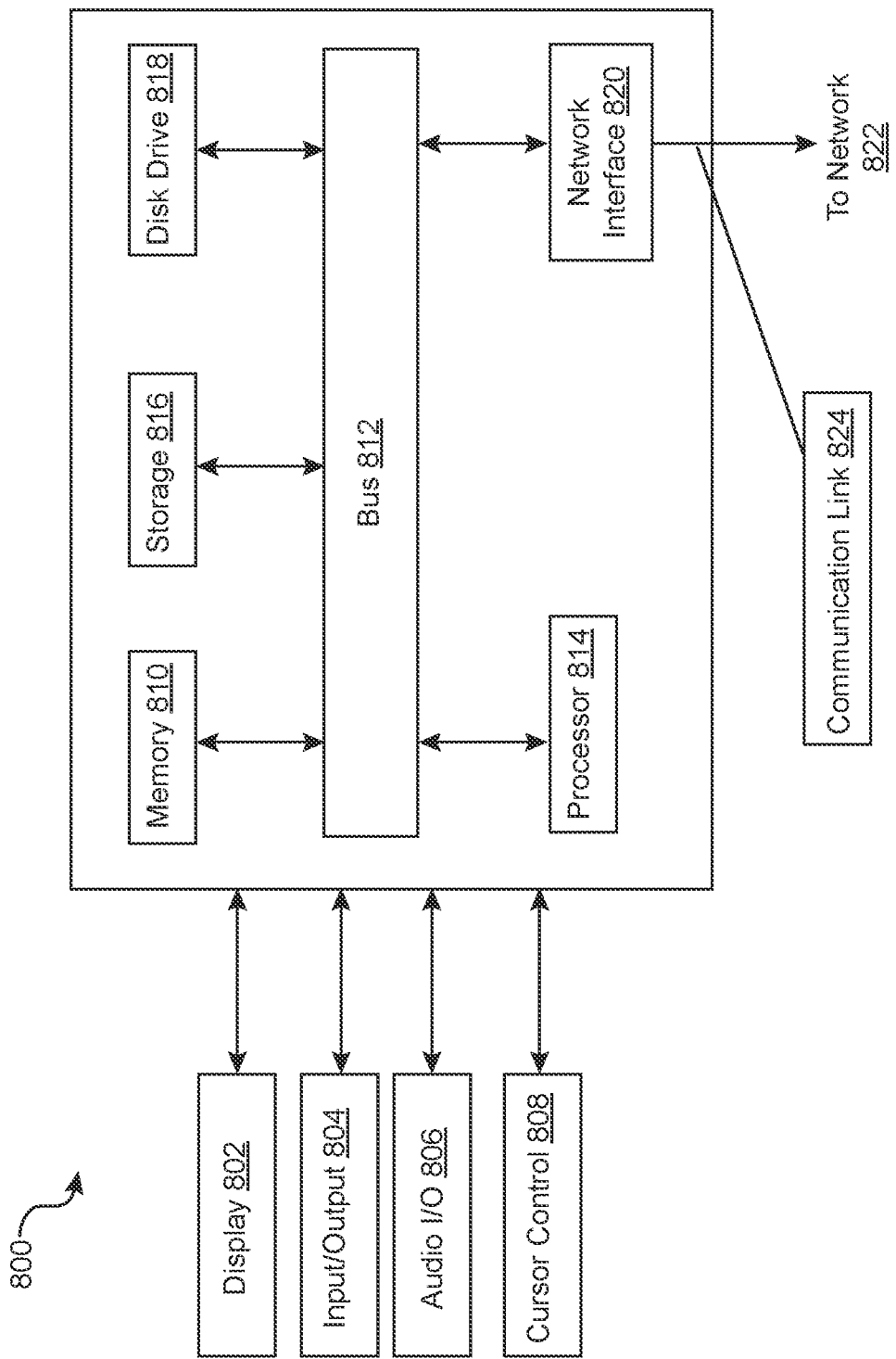
FIG. 8 is a block diagram of a system for implementing a device according to an embodiment of the present disclosure.

FIG. 8 shows a block diagram of a computer system 800 suitable for implementing one or more embodiments of the present disclosure, including the service provider server 110 and the user device 112. In various implementations, the user device 112 may include a mobile cellular phone, personal computer (PC), laptop, wearable computing device, etc. adapted for wireless communication, and the service provider server 110 may include a network computing device, such as a server. Thus, it should be appreciated that the devices 110 and 112 may be implemented as the computer system 800 in a manner as follows.

The computer system 800 may include a bus 812 or other communication mechanism for communicating information data, signals, and information between various components of the computer system 800. The components may include an input/output (I/O) component 804 that processes a user (i.e., sender, recipient, service provider) action, such as selecting keys from a keypad/keyboard, selecting one or more buttons or links, etc., and sends a corresponding signal to the bus 812. The computer system 800 may also include an output component, such as a display 802, and a cursor control 808 (such as a keyboard, keypad, mouse, etc.). The display 802 may be configured to present a login page for logging into a user account, a checkout page for purchasing an item from a merchant, or a chat interface for facilitating an online chat session and providing user queries. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via a network 822. In one embodiment, the transmission is wireless, although other transmission mediums and methods may also be suitable. A processor 814, which can be a micro-controller, digital signal processor, DSP, or other processing component, processes these various signals, such as for display on the computer system 800 or transmission to other devices via a communication link 824. The processor 814 may also control transmission of information, such as cookies or IP addresses, to other devices.

The components of the computer system 800 may also include a system memory component 810 (e.g., RAM), a static storage component 816 (e.g., ROM), and/or a disk drive 818 (e.g., a solid state drive, a hard drive). The computer system 800 may perform specific operations by the processor 814 and other components by executing one or more sequences of instructions contained in the system memory component 810. For example, the processor 814 can perform a method for determining a response to a user query described herein according to the method 300.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network 822 (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of the disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of the application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system comprising:
    a non-transitory memory having program instructions stored thereon; and
    one or more hardware processors coupled to the non-transitory memory and configured to execute the stored instructions to cause the system to perform operations comprising:
        detecting reception of a user query by a chatbot;
        utilizing an augmentation machine learning model to determine multiple different variations of the user query that are semantically related to the user query;
        storing the multiple different variations of the user query in a first asynchronous decoupling buffer;
        accessing a set of documents, wherein a given document includes one or more query-response pairs, including:
            querying the set of documents by comparing queries of query-response pairs in the documents with both:
                the user query; and
                the multiple different variations of the user query from the first asynchronous decoupling buffer;
        determining a plurality of response candidates based on the querying and storing the plurality of response candidates in a second asynchronous decoupling buffer;
        determining a final response candidate from the plurality of response candidates from the second asynchronous decoupling buffer, wherein the determining utilizes a semantic machine learning model to perform a semantic comparison between the plurality of response candidates and at least the user query; and
        outputting, by the chatbot, a response to the user based on the determined final response candidate.

2. The system of claim 1, wherein determining the plurality of response candidates that correspond to the user query is based on a term frequency-inverse document frequency process comparing the user query and the multiple different variations of the user query to the set of documents.

3. The system of claim 1, wherein the operations further comprise:
    monitoring user browsing activity; and
    generating the user query and directing the user query to the chatbot based on the browsing activity.

4. The system of claim 1,
    wherein the utilizing the augmentation machine learning model includes:
        performing a most-similar word search to generate words similar to words in the user query;
        mapping the user query and results of the most-similar word search to a vector space;
        performing a distributed word-embedding technique to compare learned representations of semantically-related words as multi-dimensional vectors in the vector space; and
        outputting the multiple different variations based on the distributed word-embedding;
    wherein the utilizing of the semantic machine learning model includes:
        providing token sequences that include tokens from the user query and tokens from a given response candidate;
        processing the token sequences using a Bidirectional Encoder Representations from Transformers (BERT)

model to generate score values that reflects a semantic relationship between the user query and a given response candidate;
generating an initial ranking of the score values;
adjust the initial ranking, using a ranking loss model, to generate a final ranking, wherein the determining the response candidate is based on the final ranking; and
propagating the final ranking to the BERT model.

5. The system of claim 1, wherein the determining the final response candidate includes:
determining scores for the plurality of response candidates, and
identifying the response candidate having the highest score as the final response candidate.

6. The system of claim 5, wherein, when determining scores for the plurality of response candidates, semantic similarities of the response candidates to the user query are weighted more than syntactic similarities of the response candidates to the user query.

7. The system of claim 1, wherein the first asynchronous decoupling buffer is a push/pull buffer.

8. The system of claim 1, wherein the operations further comprise utilizing one or more normalization techniques to normalize the user query; and
wherein the augmentation machine learning model determines the multiple different variations of the user query that correspond to a semantic meaning of the normalized user query.

9. The system of claim 8, wherein utilizing one or more normalization techniques to normalize the user query includes utilizing a text normalization machine learning model to normalize the user query.

10. A computer-implemented method comprising:
detecting, by a computing system, reception of a user query by a chatbot;
utilizing, by the computing system, an augmentation machine learning model to determine multiple different variations of the user query that are semantically related to the user query;
storing, by the computing system, the multiple different variations of the user query in a first asynchronous decoupling buffer;
accessing, by the computing system, a set of documents, wherein a given document includes one or more query-response pairs, including:
querying, by the computing system, the set of documents by comparing queries of query-response pairs in the documents with both:
the user query; and
the multiple different variations of the user query from the first asynchronous decoupling buffer;
determining, by the computing system, a plurality of response candidates based on the querying and storing the plurality of response candidates in a second asynchronous decoupling buffer;
determining, by the computing system, a final response candidate from the plurality of response candidates from the second asynchronous decoupling buffer, wherein the determining utilizes a semantic machine learning model to perform a semantic comparison between the plurality of response candidates and at least the user query; and
outputting, by the chatbot, a response to the user based on the determined final response candidate.

11. The computer-implemented method of claim 10, wherein determining the plurality of response candidates that correspond to the user query is based on a term frequency-inverse document frequency process to compare the user query and the multiple different variations of the user query to the set of documents.

12. The computer-implemented method of claim 10, wherein the user query and the multiple different variations of the user query are syntactically different and semantically similar.

13. The computer-implemented method of claim 10, wherein the determining the final response candidate includes:
determining scores for the plurality of response candidates, and
identifying the response candidate having the highest score as the final response candidate.

14. The computer-implemented method of claim 10, further comprising:
monitoring, by the system, user browsing activity; and
generating, by the system, the user query and directing the user query to the chatbot based on the browsing activity.

15. A non-transitory machine-readable medium having stored thereon machine-readable instructions executable to cause a machine to perform operations comprising:
detecting reception of a user query by a chatbot;
utilizing an augmentation machine learning model to determine multiple different variations of the user query that are semantically related to correspond to a semantic meaning of the user query;
storing the multiple different variations of the user query in a first asynchronous decoupling buffer;
accessing a set of documents, wherein a given document includes one or more query-response pairs, including:
querying the set of documents by comparing queries of query-response pairs in the documents with both:
the user query; and
the multiple different variations of the user query from the first asynchronous decoupling buffer;
determining a plurality of response candidates based on the querying and storing the plurality of response candidates in a second asynchronous decoupling buffer that correspond to the user query by comparing the user query and the multiple different variations of the user query to a plurality of documents;
determining a final response candidate from the plurality of response candidates from the second asynchronous decoupling buffer, wherein the determining utilizes a semantic machine learning model to perform a semantic comparison between the plurality of response candidates and at least the user query; and
outputting, by the chatbot, a response to the user based on the determined final response candidate.

16. The non-transitory machine-readable medium of claim 15, wherein the determining the plurality of response candidates that correspond to the user query is based on a term frequency-inverse document frequency process to compare the user query and the multiple different variations of the user query to the plurality of documents.

17. The non-transitory machine-readable medium of claim 15, wherein the user query and the multiple different variations of the user query are syntactically different and semantically similar.

18. The non-transitory machine-readable medium of claim 15, wherein the determining the final response candidate comprises determining scores for the plurality of response candidates, the response candidate having the highest score being determined as the final response candidate.

19. The non-transitory machine-readable medium of claim 15, wherein the operations further comprise:
   utilizing one or more normalization techniques to normalize the user query; and
   wherein the augmentation machine learning model determines the multiple different variations of the user query that correspond to a semantic meaning of the normalized user query.

20. The non-transitory machine-readable medium of claim 19, wherein utilizing one or more normalization techniques to normalize the user query includes utilizing a text normalization machine learning model to normalize the user query.

\* \* \* \* \*